United States Patent
Toula (10) Patent No.: US 11,949,243 B2
(45) Date of Patent: Apr. 2, 2024

(54) APPARATUS AND METHODS FOR ENHANCED OPERATION IN A WIRELESS CHARGING RECEIVER

(71) Applicant: STMICROELECTRONICS DESIGN AND APPLICATION S.R.O., Prague (CZ)

(72) Inventor: Michal Toula, Prague (CZ)

(73) Assignee: STMICROELECTRONICS DESIGN AND APPLICATION S.R.O., Prague (CZ)

( * ) Notice: Subject to any disclaimer, the term of this patent is extended or adjusted under 35 U.S.C. 154(b) by 601 days.

(21) Appl. No.: 17/124,915

(22) Filed: Dec. 17, 2020

(65) Prior Publication Data

US 2022/0200344 A1 Jun. 23, 2022

(51) Int. Cl.
*H02J 50/12* (2016.01)
*H02J 7/02* (2016.01)
*H02J 50/80* (2016.01)

(52) U.S. Cl.
CPC ........... *H02J 50/12* (2016.02); *H02J 7/02* (2013.01); *H02J 50/80* (2016.02)

(58) Field of Classification Search
CPC .... H02J 50/12; H02J 7/02; H02J 50/80; H02J 7/04; H02J 50/005; H02J 7/00036; H02J 7/007; H02J 7/06; H02M 3/33592
See application file for complete search history.

(56) References Cited

U.S. PATENT DOCUMENTS

| | | | |
|---|---|---|---|
| 10,644,531 B1* | 5/2020 | Qiu | H02J 50/10 |
| 11,095,170 B1* | 8/2021 | Wang | H02J 7/00045 |
| 2013/0235635 A1* | 9/2013 | Takahagi | H02J 7/02 363/127 |
| 2015/0244176 A1* | 8/2015 | Van Den Brink | H02J 50/80 307/104 |
| 2016/0336804 A1* | 11/2016 | Son | H02J 50/80 |
| 2017/0025897 A1* | 1/2017 | Menegoli | H04B 5/0037 |
| 2017/0040846 A1* | 2/2017 | Sankar | H04B 5/0037 |
| 2017/0256956 A1* | 9/2017 | Irish | H02M 7/217 |
| 2018/0262057 A1* | 9/2018 | Lee | H02J 7/007 |
| 2018/0287396 A1* | 10/2018 | Hanabusa | H02J 50/10 |
| 2019/0334366 A1* | 10/2019 | Blaha | H04B 5/0081 |
| 2020/0059119 A1* | 2/2020 | Maniktala | H02J 50/12 |

OTHER PUBLICATIONS

Wireless Power Consortium, "The Qi Wireless Power Transfer System Power Class 0 Specification, Parts 1 and 2: Interface Definitions," Version 1.2.3, Feb. 2017, 165 pages.

* cited by examiner

*Primary Examiner* — Jared Fureman
*Assistant Examiner* — Michael J Warmflash
(74) *Attorney, Agent, or Firm* — Slater Matsil, LLP (57) ABSTRACT

A method implemented by a wireless charging receiver (RX) includes detecting, by the wireless charging RX, that a voltage potential of an output of a rectifier of the wireless charging RX has met a boost mode threshold; placing, by the wireless charging RX, the rectifier into a boost mode; and detecting, by the wireless charging RX, that the voltage potential of the output of the rectifier of the wireless charging RX has met a specified threshold, and based thereon, negotiating, by the wireless charging RX with a wireless charging transmitter (TX), to initiate a power transfer.

20 Claims, 8 Drawing Sheets

APPARATUS AND METHODS FOR ENHANCED OPERATION IN A WIRELESS CHARGING RECEIVER

TECHNICAL FIELD

The present invention relates generally to methods and apparatus for enhanced operation in a wireless charging receiver.

BACKGROUND

Powering electronic devices has been a challenge for system designers. Early electronic devices were tethered to an electrical power source by a power cord. Batteries provided freedom to move around, but the batteries still required replacement or recharging. Recharging the batteries required the batteries or the electronic devices be plugged into an electrical power source using a power cord.

Wireless charging systems eliminate the power cord by transferring power in free space, where the power can be used to charge the rechargeable batteries or directly power the electronic device. Wireless charging systems eliminate difficulties associated with plugging the power cord to the electronic device, such as fumbling with the orientation of the plug, ensuring that the correct power cord is being used, wearing out of physical connectors and connections, and so on. Therefore, wireless charging systems are attractive to end-users.

The Qi standard by the Wireless Power Consortium (WPC) is currently the protocol used in the majority of wireless charging systems. Qi wireless charging systems are based on magnetic induction between a wireless charging transmitter (TX) and a wireless charging receiver (RX). A wireless charging TX initiates a power transfer session by periodically transmitting a digital ping to identify a wireless charging RX positioned in close proximity to the wireless charging TX (such as being placed on a surface of the wireless charging TX). The wireless charging RX, upon detecting the digital ping, can begin negotiating with the wireless charging TX. However, if the wireless charging RX is not well coupled to the wireless charging TX (for example, the charging resonant coils are misaligned or a particular combination of wireless charging TX and wireless charging RX charging resonant circuit results in a low rectifier output voltage due to the fixed predefined wireless charging TX operating point used during ping and identification & configuration phases, and so on), the digital ping may not be detected by the wireless charging RX. Therefore, there is a need for methods and apparatus for enhanced ping mode operation in the wireless charging RX.

SUMMARY

In accordance with an embodiment, a method implemented by a wireless charging receiver (RX) is provided. The method comprising: detecting, by the wireless charging RX, that a voltage potential of an output of a rectifier of the wireless charging RX has met a boost mode threshold; placing, by the wireless charging RX, the rectifier into a boost mode; and detecting, by the wireless charging RX, that the voltage potential of the output of the rectifier of the wireless charging RX has met a specified threshold, and based thereon, negotiating, by the wireless charging RX with a wireless charging transmitter (TX), to initiate a power transfer.

In accordance with an embodiment, a wireless charging RX is provided. The wireless charging RX comprising: a non-transitory memory storage comprising instructions; and one or more processors in communication with the memory storage, wherein the one or more processors execute the instructions to cause the wireless charging RX to: detect that a voltage potential of an output of a rectifier of the wireless charging RX has exceeded a boost mode threshold; place the rectifier into a boost mode; and detect that the voltage potential of the output of the rectifier of the wireless charging RX has met a specified threshold, and based thereon, negotiate, with a wireless charging TX, to initiate a power transfer.

In accordance with an embodiment, a wireless charging RX is provided. The wireless charging RX comprising: a rectifier operatively coupled to a receive resonant circuit, the rectifier configured to output a direct current (DC) voltage in accordance with received energy received by the receive resonant circuit from a wireless charging TX; a non-transitory memory storage comprising instructions; and one or more controllers in communication with the memory storage, wherein the one or more controllers execute the instructions to cause the wireless charging RX to: detect that a voltage potential of an output of the rectifier has exceeded a boost mode threshold; place the rectifier into a boost mode; and detect that the voltage potential of the output of the rectifier of the wireless charging RX has met a specified threshold, and based thereon, negotiate, with a wireless charging TX, to initiate a power transfer.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

In the ensuing description one or more specific details are illustrated, aimed at providing an understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the scope of protection or the scope of the embodiments.

Figure 1:
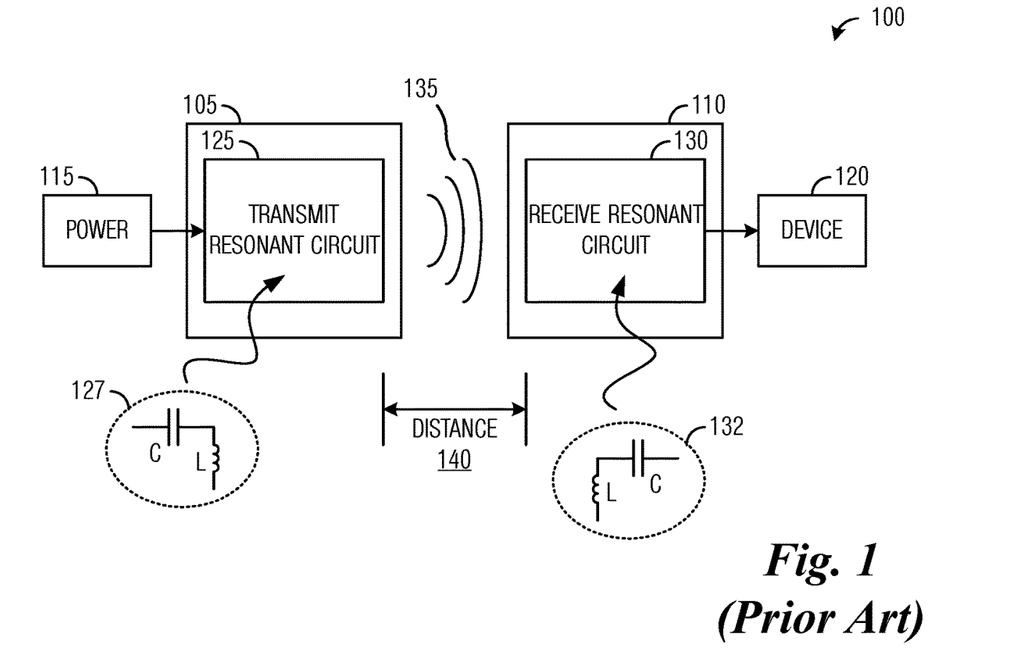
FIG. 1 illustrates a prior art wireless charging system.

FIG. 1 illustrates a prior art wireless charging system 100. Wireless charging system 100 may be adherent to the Qi standard by the Wireless Charging Consortium (WPC). Details of the communication can be found in the Qi standard defined by the WPC.

Wireless charging system 100 includes a wireless charging transmitter (TX) 105 and a wireless charging receiver (RX) 110. Wireless charging TX 105, coupled to a power source 115, provides energy to wireless charging RX 110, which in turn, provides power to a device 120 coupled to wireless charging RX 110. The power provided to device 120 may be used to charge rechargeable batteries in device 120 or to directly power device 120 or both. The process of providing energy is referred to as a power transfer.

Wireless charging TX 105 includes a transmit resonant circuit 125. A resonant circuit may be characterized by an inductance (L) and a capacitance (C) of the resonant circuit (shown in highlighted regions 127 for wireless charging TX 105), and the power transferred between wireless charging TX 105 and wireless charging RX no is a function of both the inductance and the capacitance of the resonant circuits of the wireless charging TX 105 and the wireless charging RX no. The purpose of the capacitance (C) is to enhance the efficiency of the power transfer and inductance L is used to transfer the power (transmit coil converts electric current into magnetic flux and receive coil converts magnetic flux into electromotive force). Transmit resonance circuit 125 transmits an energized wireless field (shown as lines 135) using the transmit coil. The energized wireless field (lines 135) is received by a receive resonant circuit 130 of wireless charging RX no. Resonant circuit 130 may also be characterized by an inductance (L) and a capacitance (C), which are shown in highlighted region 132.

In addition to transmitting and receiving energized wireless fields, a changing of parameters of receive resonant circuit 130 may be used to communicate from wireless charging RX no to wireless charging TX 105. For example, in communications between wireless charging RX no to wireless charging TX 105, the information being communicated may be used to modulate the amplitude of the wireless fields, thereby enabling the transmission or reception of the information. For example, in communications between wireless charging TX 105 to wireless charging RX no, the information being communicated may be used to modulate the frequency of the wireless fields, thereby enabling the transmission or reception of the information. As an example, wireless charging TX 105 and wireless charging RX no communicate to initiate a wireless charging session, set a charging mode, control the amount of energy transmitted by wireless charging TX 105, control the amount of energy received by wireless charging RX no, terminate a wireless charging session, and so on. The communication performed is mainly in the uplink direction, e.g., from wireless charging RX no to wireless charging TX 105.

Figure 2:
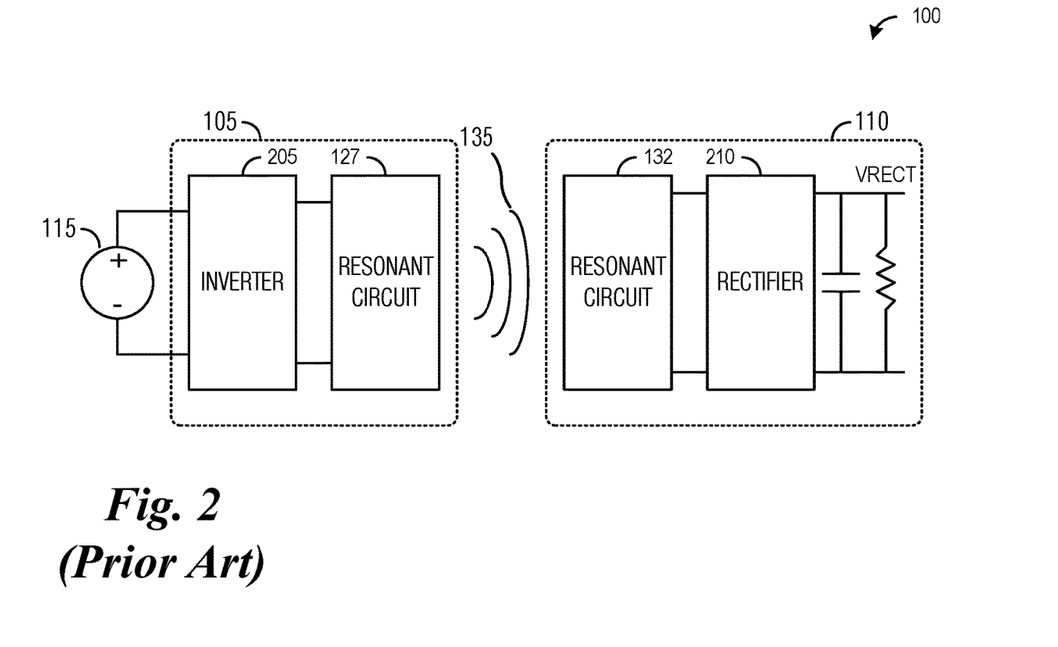
FIG. 2 illustrates a detailed view of the prior art wireless charging system of FIG. 1.

FIG. 2 illustrates a detailed view of a prior art wireless charging system 100. Wireless charging system 100 includes wireless charging TX 105 and wireless charging RX 110. When operating, wireless charging TX 105 provides power to wireless charging RX no to charge a device coupled to wireless charging RX 110.

Wireless charging TX 105 includes resonant circuit 127 and an inverter 205. Inverter 205 may be implemented as a full bridge inverter or a half bridge inverter, for example. Inverter 205 converts the direct current (DC) provided by power 115 into alternating current (AC). Wireless charging RX no includes resonant circuit 132 and a rectifier 210.

Resonant circuits 127 and 132, coupled together, form an air core transformer. Wireless charging RX no receives the AC power and converts the AC power back into DC using rectifier 210. The DC voltage is supplied to charge a battery or power a device, for example. Because the battery typically requires a specific voltage to charge, an output voltage of rectifier 210 (VRECT) of wireless charging RX no needs to be within a specific range. If the output voltage of rectifier 210 (VRECT) goes outside of the specific range, wireless charging RX no may be damaged due to an overvoltage condition or battery charging can be slowed down due to an undervoltage condition. Additionally, if VRECT goes below a threshold level (i.e., the minimum operating voltage threshold UVLO) in the undervoltage condition, wireless charging RX no may be reset.

Based on the level of the received power, wireless charging RX no communicates with wireless charging TX 105 to request an increase or decrease in the power provided by wireless charging TX 105. In the Qi standard, wireless charging RX no may communicate with wireless charging TX 105 using one or more control error packets. After receiving the one or more control error packets, wireless charging TX 105 adjusts the power by controlling one or more of the following:

AC frequency;
AC duty cycle or AC phase shift;
Input voltage (as provided by power supply 115).

The above values, which can be varied to adjust the power received by wireless charging RX no, may be referred to as the operating point of the wireless charging TX 105.

Figure 3:
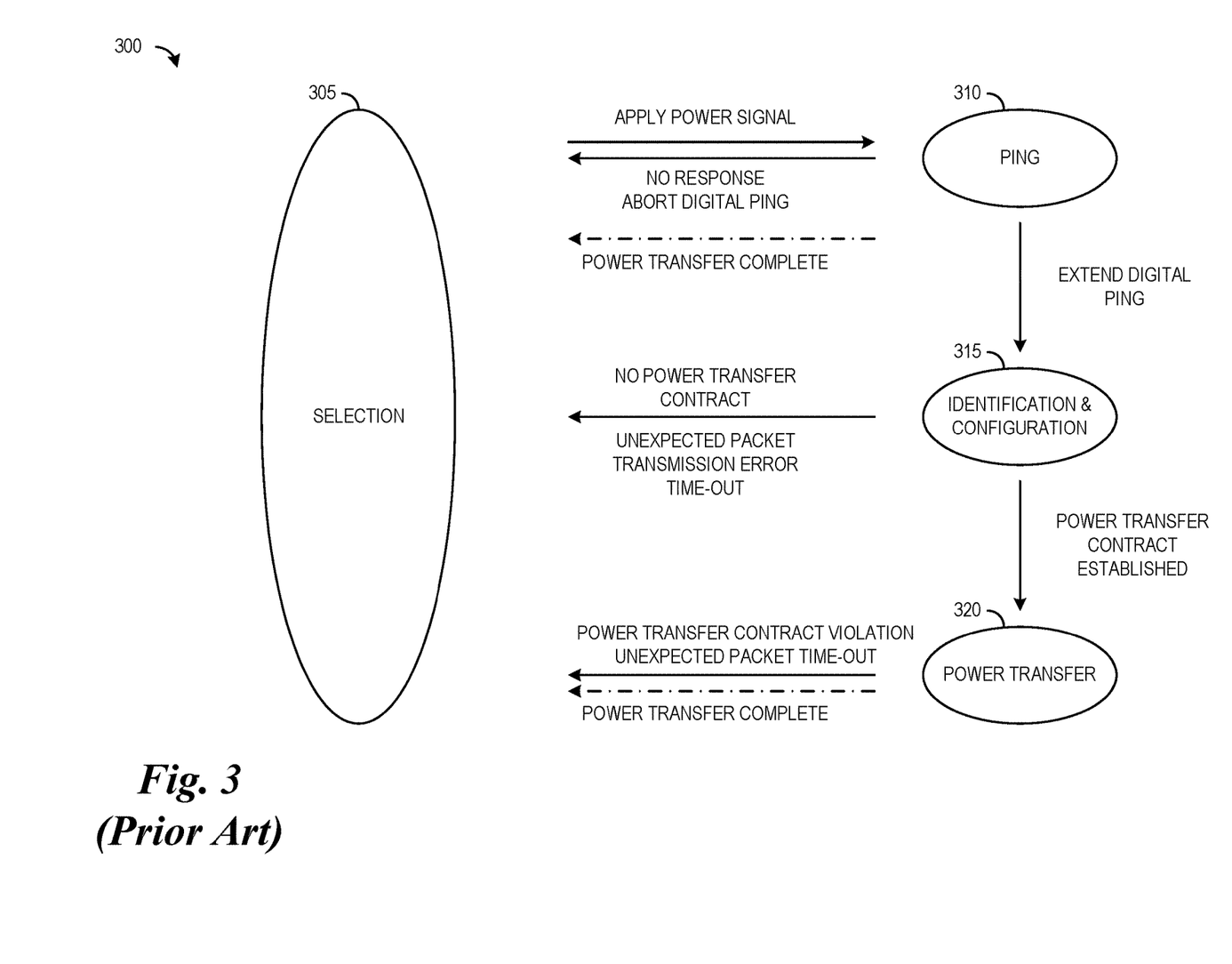
FIG. 3 illustrates a prior art phase diagram of the phases comprising power transfer involving wireless charging transmitter (TX) and wireless charging receiver (RX)

FIG. 3 illustrates a prior art phase diagram 300 of the phases comprising power transfer involving wireless charging TX 105 and wireless charging RX no. The Qi technical standards, which are hereby incorporated herein by reference in its entirety, specifies that power transfer from wireless charging TX 105 to wireless charging RX no comprises four phases: selection 305, ping 310, identification & configuration 315, and power transfer 320. Wireless charging TX 105 may transition between these four phases based on signals or events that wireless charging TX 105 receives or detects. Transitions between the different phases may be initiated by wireless charging TX 105 (shown as solid arrowed lines) or wireless charging RX no (shown as dashed-dotted arrowed lines).

In selection phase 305, wireless charging TX 105 monitors for the placement and removal of wireless charging RXs. As an example, wireless charging TX 105 is able to detect the placement of wireless charging RX no on or near its resonant circuit 127. After detecting the placement of wireless charging RX no, wireless charging TX 105 determines whether or not to proceed to ping phase 310. As an example, wireless charging TX 105 may determine to not proceed to ping phase 310 if wireless charging RX no has terminated a specified number of successive power transfer attempts.

In ping phase 310, wireless charging TX 105 executes a digital ping to initiate a power transfer with wireless charging RX no that was detected during selection phase 305. In ping phase 310, wireless charging TX 105 applies a power signal at a fixed operating point defined by the Tx topology definition in the Qi standard and waits for a response (e.g., a Signal Strength packet) from wireless charging RX no. The power signal may be referred to as a ping. Wireless charging RX no detects the ping when the output voltage VRECT of rectifier 210 exceeds a minimum operating voltage threshold UVLO. If the output voltage VRECT does not exceed the minimal operating voltage threshold UVLO, wireless charging RX no does not turn on and the ping is missed. A detailed discussion of the ping phase 310 is provided below. Wireless charging TX 105 may proceed to identification & configuration phase 315, depending on the response of wireless charging RX 110.

In identification & configuration phase 315, wireless charging TX 105 identifies wireless charging RX no and collects configuration information of wireless charging RX 110 or wireless charging RX no configures wireless charging TX 105. Identification and collection of configuration information may be based on packets received from wireless charging RX 110, for example. These two phases are the minimal communication between wireless charging TX 105 and wireless charging RX no as defined by the Qi standards which are needed before power transfer commences. In other applications, it is possible that additional communications are performed, for negotiation purposes, for example, before entering the power transfer, which is performed at a predefined ping frequency. In power transfer phase 320, wireless charging TX 105 controls the power transfer (i.e., the operating point) based on request(s) from wireless charging RX 110. Wireless charging RX no may send control error packets (CEP) used for power control, packets to end the power transfer, packets to indicate an error, or any other packet as defined in the Qi specifications.

As discussed above, during ping phase 310, wireless charging TX 105 transmits a power signal (i.e., a ping) at a defined operating point and waits for a response from wireless charging RX 110, where the defined operating point is fixed and cannot be changed by wireless charging TX 105. Therefore, if wireless charging RX no is not well coupled to wireless charging TX 105, the output voltage VRECT of rectifier 210, which is operating in diode mode, may not exceed the minimal operating voltage threshold UVLO, wireless charging RX no does not turn on and cannot send a Signal Strength packet to wireless charging TX 105, and the ping is missed. Hence, wireless charging RX no does not respond to the ping and wireless charging TX 105 cannot advance to identification & configuration phase 315 and the power transfer does not take place.

Figure 4:
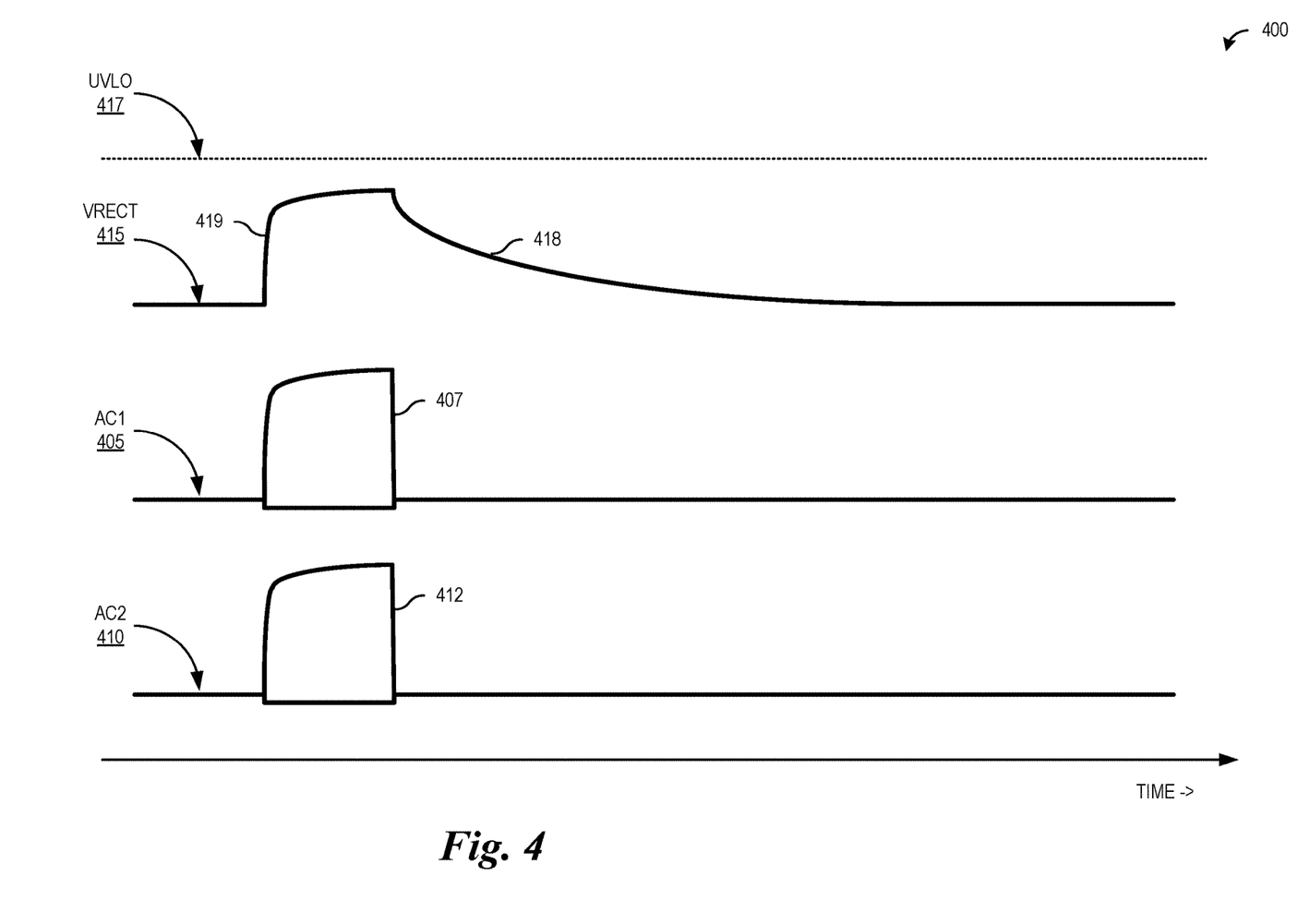
FIG. 4 illustrates a diagram of signal traces representing signals of the wireless charging RX, as the wireless charging RX participates in ping operation.

FIG. 4 illustrates a diagram 400 of signal traces representing signals of wireless charging RX no, as wireless charging RX no participates in ping operation. A first trace 405 represents the voltage potential at point AC1 of rectifier 210 of wireless charging RX no, a second trace 410 represents the voltage potential at point AC2 of rectifier 210 of wireless charging RX no, a third trace 415 represents the output voltage potential of rectifier 210 of wireless charging RX no, and a fourth trace 417 represents the minimal operating voltage threshold UVLO, which is the minimal operating voltage for operation of wireless charging RX no. Points AC1 and AC2 are inputs of rectifier 210. To simplify FIG. 4, first trace 405 and second trace 410 display signal envelops of the AC signals at the positive and negative points AC1 and AC2 of rectifier 210 rather than the AC signals themselves, which would oscillate within the signal envelops shown.

As shown in FIG. 4, pulses 407 and 412 correspond to a ping applied by wireless charging TX 105. Pulses 407 and 412 result in the voltage potential of rectifier 210 increasing (shown as pulse 419). However, the duration of the ping asserted by wireless charging TX 105 is finite and pulse 419 (the output voltage potential of rectifier 210) does not meet the minimal operating voltage threshold UVLO. Hence, wireless charging RX no does not detect the ping, and wireless charging RX no does not wake up. If the output voltage potential of rectifier 210 does not exceed the minimal operating voltage threshold UVLO, rectifier 210 operates in diode mode. As an example, rectifier 210 operates as if it comprises a plurality of diodes. Rectifier 210 enters active full wave synchronous rectifier mode (also referred to as full sync mode) only when the voltage potential of rectifier 210 exceeds the minimal operating voltage threshold UVLO and wireless charging RX no wakes up. When wireless charging TX 105 stops applying the ping, the voltage potential at points AC1 and AC2 (traces 405 and 410) drop and the output voltage potential of rectifier 210 also drops (shown as drop 418).

Although not shown in FIG. 4, the Qi standard specifies that wireless charging TX applies a specified number of pings (e.g., three). However, each ping fails because the operating point of the pings do not change and none of the pings result in the output voltage potential of rectifier 210 meeting the minimal operating voltage threshold UVLO.

The inability of the pings to cause the output voltage potential of rectifier 210 to sufficiently rise to meet the minimal operating voltage threshold UVLO may be due to poor coupling between wireless charging TX 105 and wireless charging RX 110. In general, wireless charging TX 105 and wireless charging RX no are poorly coupled if their respective resonant circuits (or coils therein) are misaligned, or a particular combination of wireless charging TX 105 and wireless charging RX no resonant coils results in a low output voltage of rectifier 210 due to the fixed predefined wireless charging TX 105 operating point used during ping phase 310 and identification & configuration phase 315. Because wireless charging TX 105 is unable to change the operating point of the ping (to increase the transmit power level or duration of the ping, for example), the ping, as well as subsequent pings, will be missed by wireless charging RX 110. Therefore, there is a need for methods and apparatus for enhanced ping operation in a wireless charging RX.

According to an example embodiment, the output voltage potential of rectifier 210 is amplified to help ensure that the minimal operating voltage threshold UVLO is met. Because the operating point of the ping is not changeable, the output voltage potential of rectifier 210 (VRECT) is amplified so that it is easier for the output voltage potential of rectifier 210 to meet (or exceed) the minimal operating voltage threshold UVLO. Amplifying the output voltage potential of rectifier 210 increases the voltage potential, making it potentially easier to meet the minimal operating voltage threshold.

According to an example embodiment, the output voltage potential of rectifier 210 is amplified by operating rectifier 210 in a boost mode. Operating in the boost mode increases the output voltage potential of rectifier 210. A detailed discussion of operating rectifier 210 in boost mode is provided below. In an embodiment, operating in the boost mode approximately doubles the output voltage potential of rectifier 210, as compared to the voltage potential of rectifier 210 that is not operating in boost mode (as an example, rectifier 210 is operating in diode mode).

Figure 5:
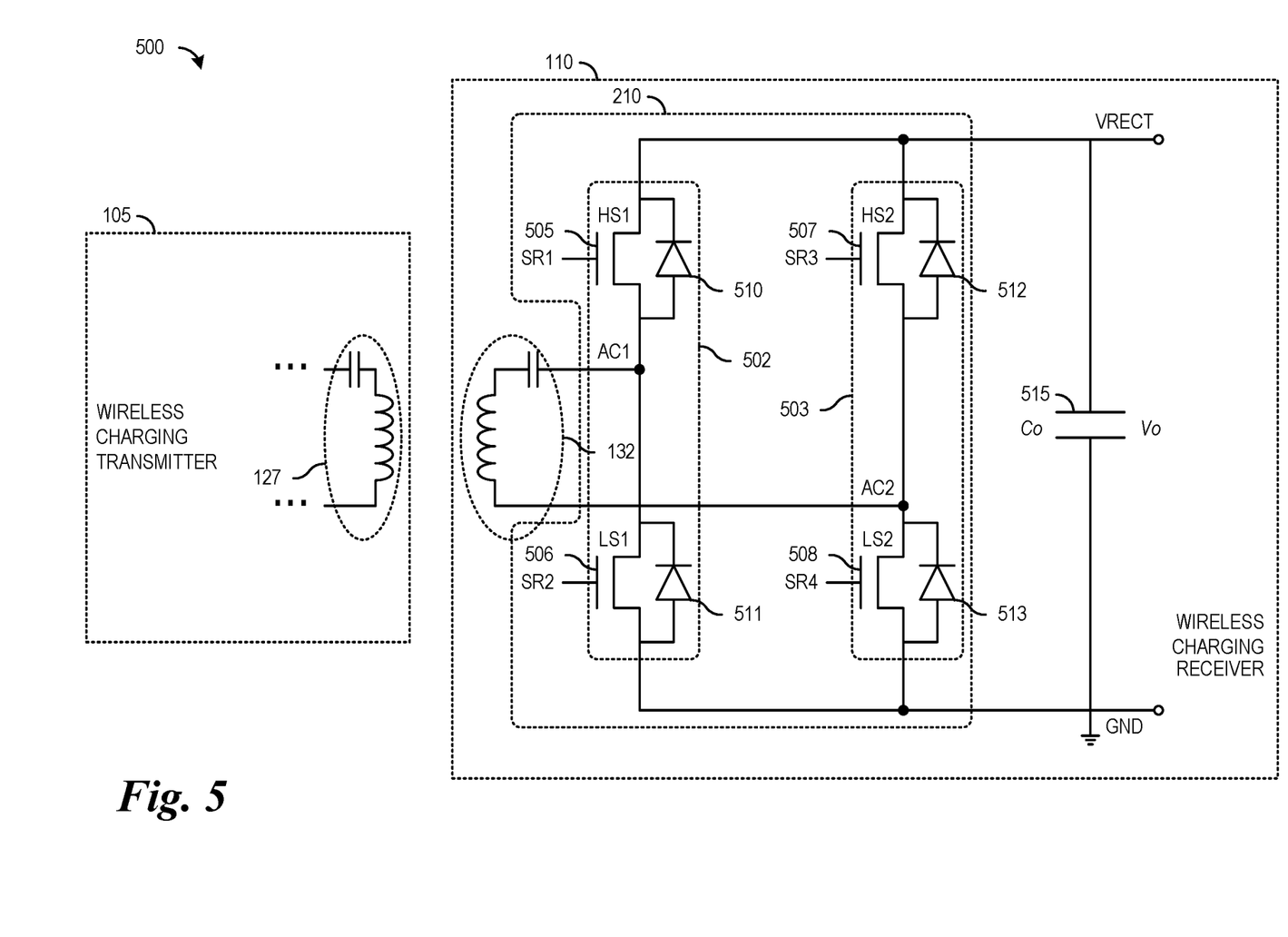
FIG. 5 illustrates an example wireless charging system, providing details of an example wireless charging RX in accordance with example embodiments presented herein.

FIG. 5 illustrates an example wireless charging system 500, providing details of an example wireless charging RX no, according to example embodiments presented herein. Wireless charging system 500 includes wireless charging TX 105 and wireless charging RX no, where wireless charging RX no includes rectifier 210 that operates in the boost mode to amplify the voltage potential of rectifier 210.

Wireless charging RX no includes a resonant circuit 132, which is shown in FIG. 5 as a coil and capacitor. Resonant circuit 132 of wireless charging RX no and resonant circuit 127 of wireless charging TX 105 are in close proximity, with some degree of coupling between the respective resonant circuits.

Wireless charging RX no includes rectifier 210. Rectifier 210 may be implemented with four field-effect transistors (FETs) 505-508 arranged in two parallel legs 502 and 503. In first leg 502, FET 505 couples a first rectifier input (AC1) to rectifier output (VRECT) and FET 506 couples the first rectifier input (AC1) to electrical ground. In second leg 503, FET 507 couples a second rectifier input (AC2) to the rectifier output (VRECT) and FET 508 couples the second rectifier input (AC2) to electrical ground. FETs 505-508 are denoted HS1, HS2, LS1, and LS2, respectively. FETs 505-508 may be p-type FETs or n-type FETs. FETs 505-508 may be junction FETs (JFETs), metal-oxide-semiconductor FETs (MOSFETs), etc.

FETs 505-508 are controlled by signals SR1, SR2, SR3, and SR4, respectively. The values of the control signals may vary, depending on the type of FETs 505-508, for example. However, independent of the type of FET, the state of FETs 505-508 are similar. A FET that is ON is conducting electricity, while a FET that is OFF is not conducting electricity. A first end of resonant circuit 132 is coupled to point AC1 between FETs 505 and 506 of rectifier 210, and a second end of resonant circuit 132 is coupled to point AC2 between FETs 507 and 508 of rectifier 210.

Parasitic body diodes 510-513 shown in FIG. 5 are inherent to the FET transistors. The output voltage potential of rectifier 210 (VRECT) may be measured across capacitor 515. As discussed above, when a FET is ON, it conducts electricity, and when the FET is OFF, it does not conduct electricity.

Rectifier 210 may operate in a diode mode, where FETs 505-508 are all OFF, and rectifier 210 behaves as if it was formed solely from diodes 510-513 because the AC signal is rectified by parasitic body diodes of the FETs. In diode mode, rectifier 210 behaves as a diode bridge rectifier.

Rectifier 210 may operate in an active full wave synchronous rectifier mode. To operate rectifier 210 in full sync mode, rectifier 210 is configured so that only one of HS1 (FET 505) or LS1 (FET 506) is ON at any given time (HS2 (FET 507) and LS2 (FET 508) are similarly configured). As an example, if HS1. (FET 505) is ON, then LS1 (FET 506) is OFF, and vice versa. HS2 (FET 507) and LS2 (FET 508) operate similarly.

Furthermore, if the voltage potential at AC1 is higher than an AC high side (HS) voltage threshold, HS1 (FET 505) is ON (and hence, LS1 (FET 506) is OFF), while if the voltage potential at AC1 is lower than an AC low side (LS) voltage threshold, LS1 (FET 506) is ON (and hence, HS1. (FET 505) is OFF). Additionally, if AC2 is higher than the AC HS voltage threshold, HS2 (FET 507) is ON (and hence, LS2 (FET 508) is OFF), while if AC2 is lower than the AC LS voltage threshold, LS2 (FET 508) is ON (and hence, HS2 (FET 507) is OFF). This control of the HS and LS FETs (operating as switches) during of the active full wave synchronous rectifier mode may be performed using four comparators, which are not shown in FIG. 5. Similar functionality can be achieved if rectifier 210 is controlled in a two comparator mode (with either AC1 and AC2 HS thresholds or AC1 and AC2 LS thresholds, which are controlling 2 FETs (HS1 (FET 505) and LS2 (FET 508) being controlled by a first threshold and HS2 (FET 507) and LS1 (FET 506) being controlled by a second threshold).

In addition to full wave synchronous rectifier mode, rectifier 210 may operate in the boost mode. As an example, in the boost mode, the output voltage potential of rectifier 210 is approximately twice the output voltage potential of rectifier 210 when rectifier 210 is operating in diode mode (where FETs 505-508 are turned off). To operate rectifier 210 in the boost mode, rectifier 210 is configured so that only one of HS1 (FET 505) or LS1 (FET 506) is ON at any given time and HS2 (FET 507) is configured to be always OFF and LS2 (FET 508) is configured to be always ON. Furthermore, if AC1 is higher than an AC HS voltage threshold, HS1 (FET 505) is ON (and hence, LS1 (FET 506) is OFF), while if AC1 is lower than an AC LS voltage threshold, LS1 (FET 506) is ON (and hence, HS1 (FET 505) is OFF). Alternatively, rectifier 210 is configured so that only one of HS2 (FET 507) or LS2 (FET 508) is ON at any given time and HS1 (FET 505) is configured to be always OFF and LS1 (FET 506) is configured to be always ON. In this alternative, if AC2 is higher than an AC HS voltage threshold, HS2 (FET 507) is ON (and hence, LS2 (FET 508) is OFF), while if AC2 is lower than an AC LS voltage threshold, LS2 (FET 508) is ON (and hence, HS2 (FET 507) is OFF). In either configuration, the output voltage potential of rectifier 210 operating in boost mode is about twice that of the output voltage potential of rectifier 210 when configured for operation in diode mode. The AC HS and AC LS voltage thresholds for boost mode may be the same or different from the AC HS and AC LS voltage thresholds used in active full wave synchronous rectifier mode.

According to an example embodiment, rectifier 210 is operating in boost mode during the entirety of ping phase 310 and identification & configuration phase 315. Rectifier 210 operates in boost mode during these phases to amplify the output voltage potential of rectifier 210. When not in ping phase 310 and identification & configuration phase 315 (or other phases done at ping TX operating point before power transfer phase), rectifier 210 may operate in active full wave synchronous mode or diode mode (or some mode other than boost mode). Operating in active full wave synchronous mode may allow rectifier 210 to operate more efficiently, increasing the efficiency of the power transfer phase 320, for example.

According to an example embodiment, rectifier 210 begins to operate in boost mode when the voltage potential of rectifier 210 meets a boost threshold. The boost threshold may be a specified voltage value above which rectifier 210 commences operating in boost mode and is lower than the minimal operating voltage threshold UVLO, for example. The boost threshold may be specified by design targets or capabilities. An example design target is to have the boost threshold be as small as possible to help improve ping detection performance.

In an alternative embodiment, the boost threshold may be dynamically set. As an example, if wireless charging RX no detects a sequence of pings but none of them exceed the specified threshold UVLO and wireless charging RX no is unable to respond to the pings, wireless charging RX no may reduce the boost threshold.

According to an example embodiment, rectifier 210 exits boost mode after the output voltage potential of rectifier 210 meets or exceeds the specified threshold UVLO and ping phase 310 and identification & configuration phase 315 are completed, as well as any other negotiation performed at the ping operating point of wireless charging TX 105 before power transfer phase 320 commences where wireless charging TX 105 is regulating the power based on the needs of wireless charging RX 110. Rectifier 210 may exit boost mode based on a dynamically selected VRECT threshold, such as a full sync threshold, for example. As an example, when the output voltage potential of rectifier 210 (which is operating in boost mode) meets the full sync threshold, rectifier 210 switches to active full wave synchronous rectifier mode operation. The full sync threshold may be set to reflect a point when the output voltage potential of rectifier 210 is sufficiently high for efficient operation, for example. When rectifier 210 exits boost mode, rectifier 210 enters active full wave synchronous mode, for example. Alternatively, rectifier 210 may remain in boost mode during the entirety of power transfer phase 320.

Figure 6:
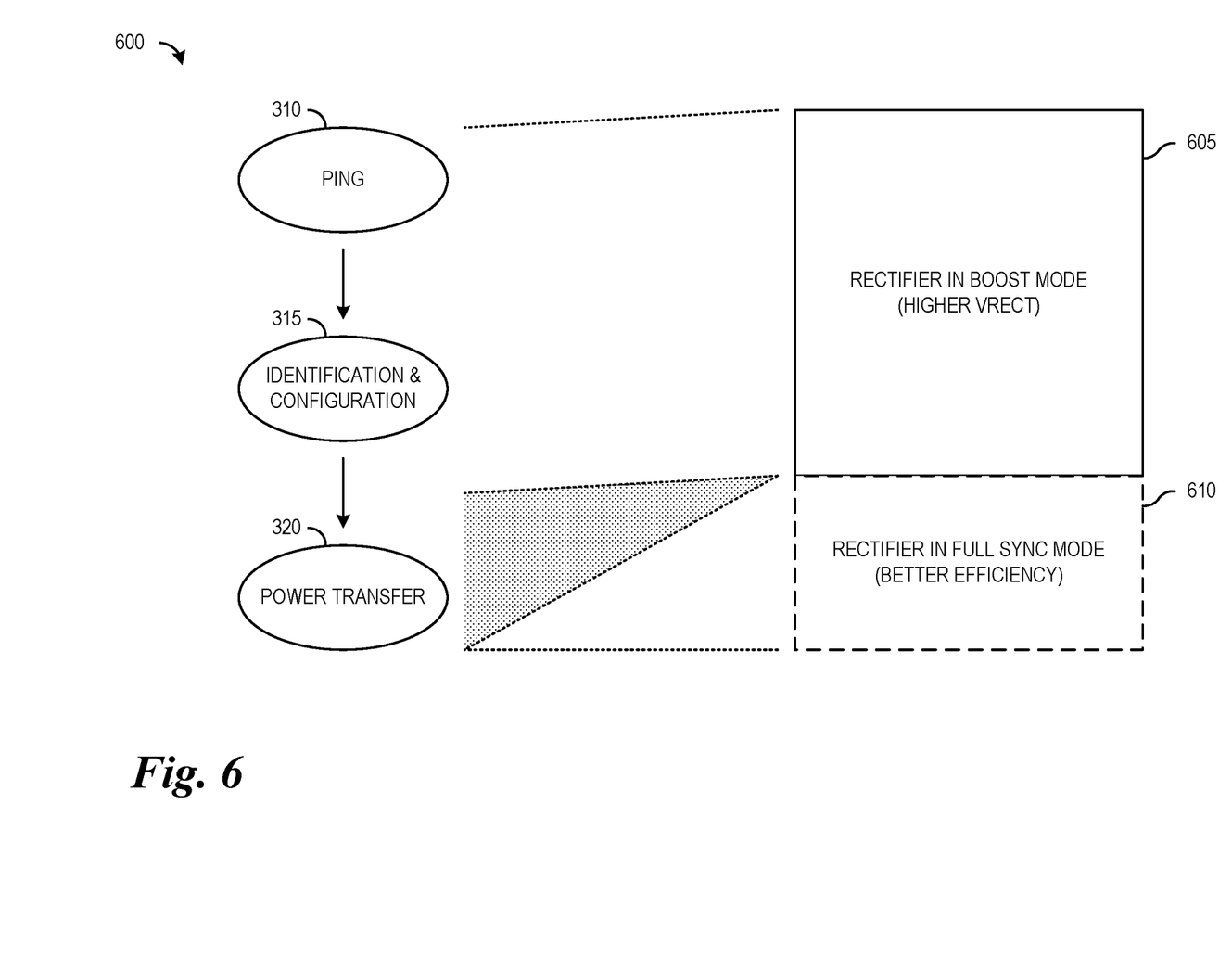
FIG. 6 illustrates a diagram highlighting a portion of the phase diagram of FIG. 3 in accordance with example embodiments presented herein.

FIG. 6 illustrates a diagram 600 highlighting a portion of phase diagram 300, according to example embodiments presented herein. Diagram 600 illustrates possible modes of rectifier 210 for different phases of phase diagram 300. While in ping phase 310, rectifier 210 is operating in boost mode 605. Operation in boost mode, as disclosed here, is not limited to the different phases of the Qi Power transfer discussed above. Boost mode may also be used for any other negotiations which are performed at fixed predefined wireless charging TX 105 ping operating points and where wireless charging TX 105 is not allowed to change the operating point. As discussed previously, rectifier 210 may exit boost mode 605 during power transfer phase 320 and rectifier 210 may enter active full wave synchronous rectifier mode 610, for example. This transition may occur when VRECT exceeds the full sync threshold. In another embodiment, rectifier 210 remains in boost mode until after power transfer phase 320, remaining in boost mode 605 for all of ping phase 310, identification & configuration phase 315, and power transfer phase 320, for example.

Figure 7:
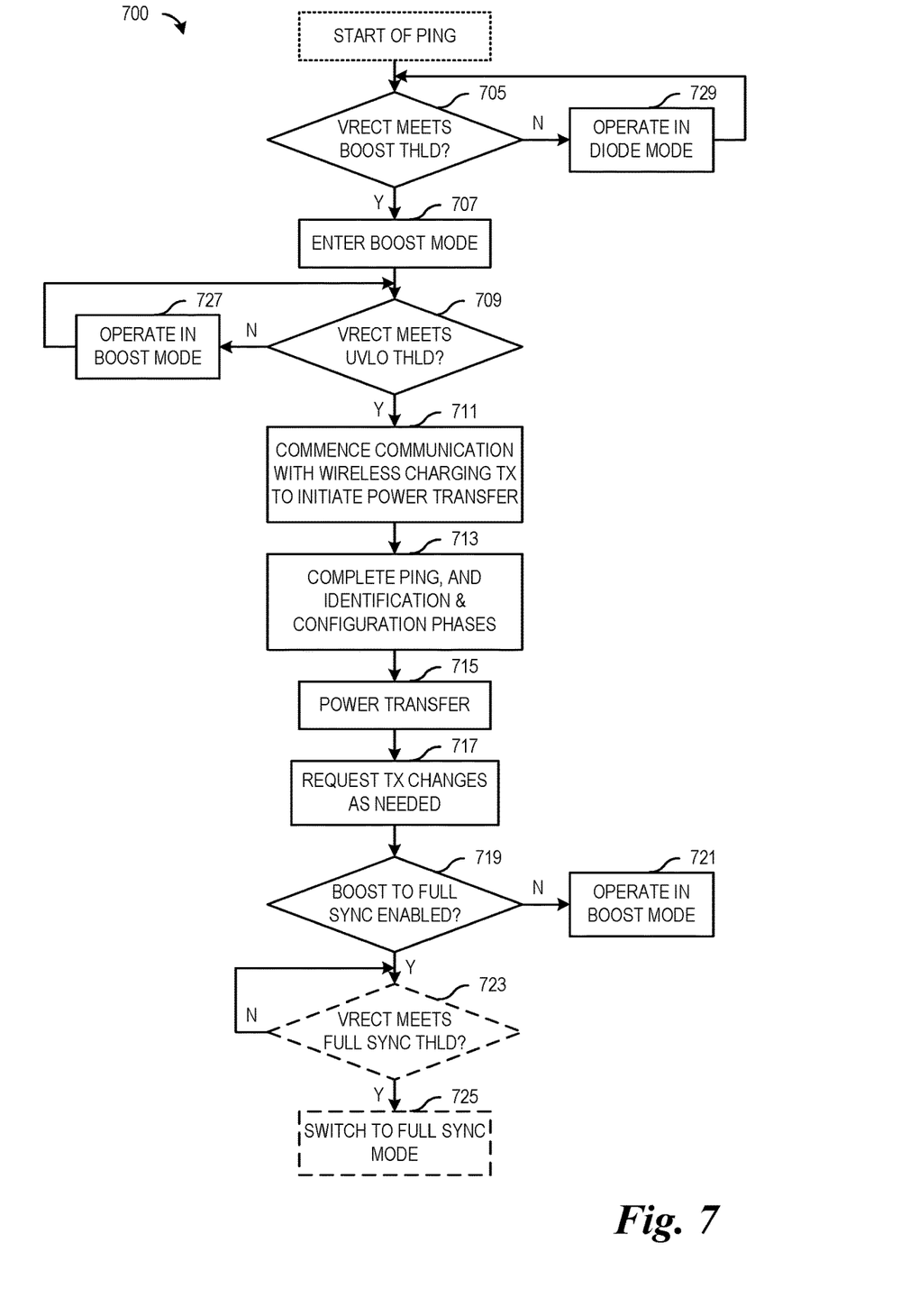
FIG. 7 illustrates a flow diagram of example operations occurring in the wireless charging RX capable of operating in boost mode in accordance with example embodiments presented herein.

FIG. 7 illustrates a flow diagram of example operations 700 occurring in wireless charging RX no capable of operating in boost mode, according to example embodiments presented herein. Operations 700 may be indicative of operations occurring in wireless charging RX no as wireless charging RX no participates in a power transfer. Operations 700 may begin at the start of ping operation.

Operations 700 begin with wireless charging RX no performing a check to determine if the output voltage potential of rectifier 210 meets the boost threshold (block 705). Rectifier 210 may be operating in the diode mode at this point, by turning all of the FETs OFF, for example. If the voltage potential of rectifier 210 meets the boost threshold, rectifier 210 enters boost mode (block 707). Rectifier 210 may enter boost mode by reconfiguring the FETs of rectifier 210 as discussed previously, for example. Operating in boost mode results in an approximate doubling of the output voltage potential of rectifier 210, when compared to the output voltage potential of rectifier 210 when rectifier 210 is operating in diode mode, for example.

Wireless charging RX no performs a check to determine if the output voltage potential of rectifier 210 meets the minimal operating voltage threshold UVLO (block 709). If the voltage potential of rectifier 210 meets the minimal operating voltage threshold UVLO, wireless charging RX no may determine that it has received a ping from wireless charging TX 105 and respond. Responding to the ping commences communications with wireless charging TX 105 to initiate a power transfer (block 711). Responding to the ping may include waking wireless charging RX no and communicating with wireless charging TX 105. Waking wireless charging RX no may include taking wireless charging RX 110 out of a reduced power state or a sleep state and placing wireless charging RX no into a higher power state that supports the execution of firmware, software, or applications, as well as communications, for example. Communication between wireless charging RX no and wireless charging TX 105 may include the communication of packets to identify wireless charging RX 110, obtain configuration information about wireless charging RX 110, and so on.

Wireless charging RX no completes ping phase 310, and identification & configuration phase 315 (block 713). Once ping phase 310 and identification & configuration phase 315 are complete (as well as any other communication which is done at the fixed ping operating point of wireless charging TX 105 before power regulation is allowed), wireless charging RX no participates in the power transfer (block 715). Wireless charging RX no participates in the power transfer with wireless charging TX 105.

Wireless charging RX no may request changes to the operating point of wireless charging TX 105 as needed (block 717). Wireless charging RX no may request changes by transmitting packets to wireless charging TX 105. The packets may cause wireless charging TX 105 to increase its transmitted power, reduce its transmitted power, respond to the occurrence of an error, end the power transfer, and so on.

Wireless charging RX 110 performs a check to determine a switch from boost mode to active full wave synchronous rectifier mode is enabled (block 719). The check may examine a value stored in a memory location, a flag, or a register, for example, where the memory location, flag, or register being set to a first specified value indicates that the switch from boost mode to active full wave synchronous rectifier mode is enabled, while the memory location, flag, or register being set to a second specified value indicates that the switch is not enabled. If the switch from boost mode to active full wave synchronous rectifier mode is not enabled, wireless charging RX no continues operating rectifier 210 in boost mode (block 721).

If the switch is enabled, wireless charging RX no may perform a check to determine if the output voltage potential of rectifier 210 meets a full sync threshold (block 723). Meeting the full synch threshold may indicate that the output voltage potential of rectifier 210 is sufficiently high to enable more efficient operation in active full wave synchronous rectifier mode. If the full sync threshold is met, wireless charging RX no may switch to active full wave synchronous rectifier mode if active full wave synchronous rectifier mode is enabled (block 725). If the full sync threshold is not met, wireless charging RX no may remain in boost mode and continue to check if the full sync threshold is met (block 723).

If the output voltage potential of rectifier 210 does not meet the minimal operating voltage threshold (block 709), wireless charging RX 110 operates in boost mode (block 727) and continue checking VRECT level.

If the output voltage potential of rectifier 210 does not meet the boost threshold (block 705), wireless charging RX no operates in diode mode (block 729) and continue checking VRECT level.

Figure 8:
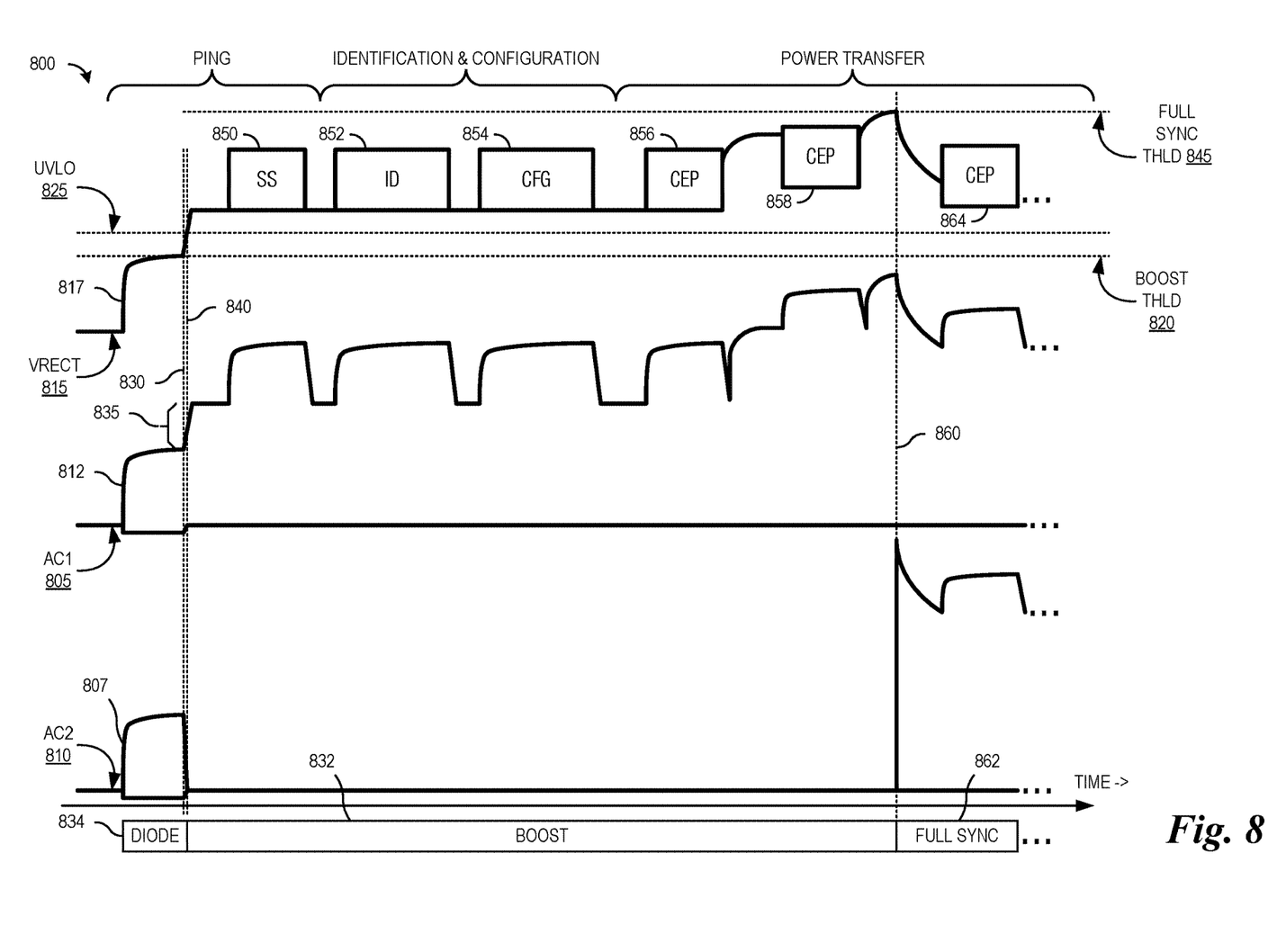
FIG. 8 illustrates a diagram of signal traces representing signals of the wireless charging RX, as the wireless charging RX participates in ping operation with boost mode to enhance ping operation in accordance with example embodiments presented herein.

FIG. 8 illustrates a diagram 800 of signal traces representing signals of wireless charging RX no, as wireless charging RX 110 participates in ping operation with boost mode to enhance ping operation, according to example embodiments presented herein. A first trace 805 represents the voltage potential at point AC1 of rectifier 210 of wireless charging RX no, a second trace 810 represents the voltage potential at point AC2 of rectifier 210 of wireless charging RX no, and a third trace 815 represents the output voltage potential of rectifier 210 of wireless charging RX no. Furthermore, a first dotted line 820 represents the boost threshold, a second dotted line 825 represents the minimum operating voltage threshold UVLO at which wireless charging RX no detects a ping and may communicate to wireless charging TX 105, and a third dotted line 845 represents the full sync threshold at which wireless charging RX 110 may switch to active full wave synchronous rectifier mode. To simplify FIG. 8, first trace 805 and second trace 810 display signal envelops of the AC signals at the positive and negative points AC1 and AC2 of rectifier 210 rather than the AC signals themselves.

As shown in FIG. 8, pulses 807 and 812 correspond to a ping applied by wireless charging TX 105. Pulses 807 and 812 result in the output voltage potential of rectifier 210 increasing (shown as pulse 817).

At about a time represented by vertical dotted line 830, the voltage potential of rectifier 210 meets the boost threshold (first dotted line 820). As discussed, when the boost threshold is met, rectifier 210 is placed into boost mode (shown as boost mode interval 832). Prior to vertical dotted line 830, rectifier 210 is operating in diode mode (shown as diode mode interval 834). A first technique to place rectifier 210 into boost mode is to force HS2 (FET 507) to be always OFF and LS2 (FET 508) to be always ON, while only one of HS1 (FET 505) or LS1 (FET 506) is ON at any given time based on the voltage potential at point AC1 (first trace 805). A second technique to place rectifier 210 into boost mode is to force HS1 (FET 505) to be always OFF and LS1 (FET 506) to be always ON, while only one of HS2 (FET 507) or LS2 (FET 508) is ON at any given time based on the voltage potential at point AC2 (second trace 810).

FIG. 8 illustrates the situation where rectifier 210 is placed into boost mode using the first technique discussed above. With rectifier 210 placed into boost mode according to the first technique discussed above, the first side of rectifier 210 comprising HS1 (FET 505) and LS1 (FET 506) continue to change depending on the signals applied by wireless charging TX 105, while the second side of rectifier 210 comprising HS2 (FET 507) and LS2 (FET 508) is coupled to electrical ground by keeping HS2 (FET 507) always OFF and (FET 508) always ON and does not change depending on the signals applied by wireless charging TX 105. If rectifier 210 is placed into boost mode using the second technique discussed above, the behavior of points AC1 and AC2 as shown in first trace AC1 805 and second trace AC2 810 would be reversed.

With rectifier 210 operating in boost mode, the amplitude of the signal at point AC1 (first trace AC1 805) increases (shown as span 835). The increase of the amplitude of the signal at point AC1 also results in an increase in the voltage potential of rectifier 210.

At about a time represented by vertical dotted line 840, the voltage potential of rectifier 210 meets the minimum operating voltage threshold UVLO (second dotted line 825). With the voltage potential of rectifier 210 meeting the minimum operating voltage threshold UVLO, wireless charging RX no has detected the ping asserted by wireless charging TX 105 and wireless charging RX no can send a response to the detected ping. As an example, wireless charging RX no and wireless charging TX 105 can communicate to initiate the power transfer. For example, wireless charging RX no and wireless charging TX 105 can communicate to respond to the ping (e.g., signal strength (SS) packet 850), identification (e.g., identification (ID) packet 852), configuration (e.g., configuration (CFG) packet 854), power regulation and error exchanges (e.g., CEPs 856 and 858), as well as perform the power transfer. The waveforms shown representing the modulation of the packets are for illustrative purposes and provide a simplified representation of the packets which are communicated by wireless charging RX no to wireless charging TX 105 and do not reflect actual waveforms on AC1, AC2, and VRECT during modulation.

In an embodiment, with rectifier 210 remaining in boost mode, the communication to perform identification and configuration may continue as shown in FIG. 8. In an embodiment, rectifier 210 may be placed into active full wave synchronous rectifier mode in power transfer phase when the output voltage potential of rectifier 210 meets a programmable threshold (e.g., full sync threshold). If rectifier 210 is in active full wave synchronous rectifier mode, the envelops of the voltage potentials at AC1 (first trace 805) and AC2 (second trace 810) may have appearance similar to first trace AC1 805 of FIG. 8. In actuality, the voltage potentials at AC1 and AC2 are opposite, where when AC1 is high, AC2 is low, and vice versa. However, their signal envelops have similar appearance. At time 860, rectifier 210 enters active full wave synchronous rectifier mode (shown as full sync interval 862, which may extend past what is shown in FIG. 8) and the envelop of the voltage potential at AC2 (second trace 810) begins to mirror the envelop of the voltage potential at AC1 (first trace 805).

As shown in FIG. 8, power transfer continues after rectifier 210 switches to active full wave synchronous rectifier mode. When rectifier 210 switches from boost mode to active full wave synchronous rectifier mode, the power transfer is still ongoing and wireless charging RX 110 is regulating the power transmitted by wireless charging TX 105 using CEPs, e.g., CEP 864.

Figure 9:
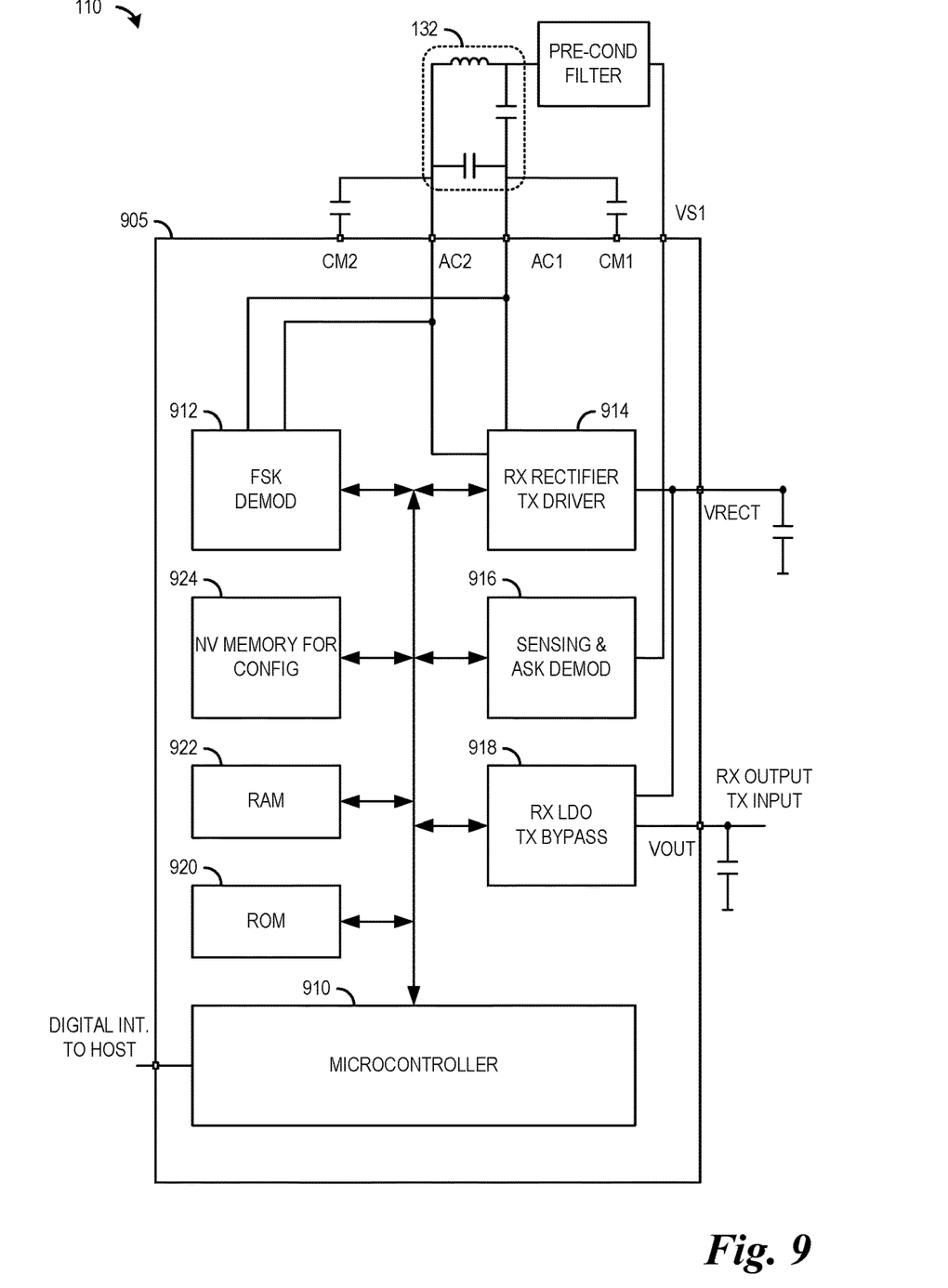
FIG. 9 illustrates an example wireless charging RX in accordance with example embodiments presented herein.

FIG. 9 illustrates an example wireless charging RX no, according to example embodiments presented herein. Wireless charging RX no includes an integrated circuit 905 that controls the operation of wireless charging RX 110, including communicating with a wireless charging TX 105, establishing a wireless charging session, controlling the power provided to an electronic device coupled to wireless charging RX no, etc. Integrated circuit 905 includes a microcontroller 910 that executes programs to control the operation of wireless charging RX no, a frequency shift keying (FSK) demodulation circuit 912 that demodulates FSK communication from a wireless charging transmitter, a RX rectifier/TX driver circuit 914 that rectifies an alternating current (AC) signal received wirelessly by wireless charging RX no (from wireless charging TX 105) or drives a signal transmitted by wireless charging TX 105 when operating as a wireless charging TX, a sensing and amplitude shift keying (ASK) demodulator circuit 916 that senses and demodulates ASK modulated signals (when operating as a wireless charging TX), a RX low dropout (LDO) circuit 918 that regulates voltages, and memory (including read-only memory (ROM) 920 to store code executed by microcontroller 910, random-access memory (RAM) 922 to store data, and non-volatile (NV) memory 924 to store configuration information).

Wireless charging RX no also includes receive resonant circuit 132 which includes an actual coil and capacitors. The coil and capacitors define the resonant circuit of wireless charging RX no, this coil is coupled with a coil of the resonant circuit of wireless charging TX 105. Output from wireless charging RX no include the output voltage of RX rectifier/TX driver circuit 914 (VRECT) and the output voltage (VOUT) used to recharge the rechargeable batteries of the electronic device coupled to wireless charging RX no or to power the electronic device directly.

RX rectifier/TX driver 914 includes rectifier 210 as described herein. Microcontroller 910 executes code stored in memory (e.g., ROM 920, RAM 922, and NV memory 924) to compare the voltage potential of rectifier 210 with thresholds (such as the boost threshold, the specified threshold UVLO, and full sync threshold), compare the voltage potential at points AC1 and AC2 of rectifier 210 with thresholds, such as, the AC HS voltage threshold and the AC LS voltage threshold (used to set the states of FETs 505-508 of rectifier 210), set the mode of rectifier 210 (e.g., full sync mode, boost mode, and so forth), set the states of FETs 505-508 of rectifier 210, and so on. Microcontroller 910 may also execute code stored in memory to dynamically set the boost threshold, as described previously.

Example embodiments of the invention are summarized here. Other embodiments can also be understood from the entirety of the specification as well as the claims filed herein.

Example 1. A method implemented by a wireless charging receiver (RX), the method including: detecting, by the wireless charging RX, that a voltage potential of an output of a rectifier of the wireless charging RX has met a boost mode threshold; placing, by the wireless charging RX, the rectifier into a boost mode; and detecting, by the wireless charging RX, that the voltage potential of the output of the rectifier of the wireless charging RX has met a specified threshold, and based thereon, negotiating, by the wireless charging RX with a wireless charging transmitter (TX), to initiate a power transfer.

Example 2. The method of example 1, where detecting that the voltage potential of the output has met the boost mode threshold occurs with the rectifier being in a diode mode.

Example 3. The method of one of examples 1 or 2, further including: while in the boost mode: completing, by the wireless charging RX with the wireless charging TX, the negotiating to initiate the power transfer at a fixed predefined operating point of the wireless charging TX; and participating, by the wireless charging RX with the wireless charging TX, in the power transfer.

Example 4. The method of one of examples 1 to 3, where negotiating to initiate the power transfer includes: identifying, by the wireless charging RX, the wireless charging RX; and configuring, by the wireless charging RX, at least one of the wireless charging RX or the wireless charging TX.

Example 5. The method of one of examples 1 to 4, where negotiating to initiate the power transfer includes: waking, by the wireless charging RX, the wireless charging RX; and transmitting, by the wireless charging RX to the wireless charging TX, a packet.

Example 6. The method of one of examples 1 to 5, where the specified threshold includes a minimal operating voltage threshold (UVLO).

Example 7. The method of one of examples 1 to 6, where the minimal operating voltage threshold is greater than the boost mode threshold.

Example 8. The method of one of examples 1 to 7, where participating in the power transfer includes: determining, by the wireless charging RX, that the voltage potential of the output of the rectifier has meet a full sync threshold, and based thereon, placing, by the wireless charging RX, the rectifier into an active full wave synchronous rectifier mode.

Example 9. The method of one of examples 1 to 8, further including transmitting, by the wireless charging RX to the wireless charging TX, a packet during at least one of a ping phase, or an identification & configuration phase.

Example 10. A wireless charging receiver (RX) including: a non-transitory memory storage including instructions; and one or more processors in communication with the memory storage, where the one or more processors execute the instructions to cause the wireless charging RX to: detect that a voltage potential of an output of a rectifier of the wireless charging RX has exceeded a boost mode threshold; place the rectifier into a boost mode; and detect that the voltage potential of the output of the rectifier of the wireless charging RX has met a specified threshold, and based thereon, negotiate, with a wireless charging transmitter (TX), to initiate a power transfer.

Example 11. The wireless charging RX of example 10, where the rectifier is in a diode mode before the voltage potential of the output exceeds the boost mode threshold.

Example 12. The wireless charging RX of one of examples 10 or 11, the instructions further causing the wireless charging RX to, while in the boost mode, complete, with the wireless charging TX, negotiations to initiate the power transfer at a fixed predefined operating point of the wireless charging TX; and participate, with the wireless charging TX, in the power transfer.

Example 13. The wireless charging RX of one of examples 10 to 12, the instructions further causing the wireless charging RX to identify the wireless charging RX; and configure at least one of the wireless charging RX or the wireless charging TX.

Example 14. The wireless charging RX of one of examples 10 to 13, where the specified threshold includes a minimum operating voltage threshold (UVLO).

Example 15. The wireless charging RX of one of examples 10 to 14, the instructions further causing the wireless charging RX to determine that the voltage potential of the output of the rectifier has meet a full sync threshold, and based thereon, place the rectifier into an active full wave synchronous rectifier mode.

Example 16. A wireless charging receiver (RX) including: a rectifier operatively coupled to a receive resonant circuit, the rectifier configured to output a direct current (DC) voltage in accordance with received energy received by the receive resonant circuit from a wireless charging transmitter (TX); a non-transitory memory storage including instructions; and one or more controllers in communication with the memory storage, where the one or more controllers execute the instructions to cause the wireless charging RX to: detect that a voltage potential of an output of the rectifier has exceeded a boost mode threshold; place the rectifier into a boost mode; and detect that the voltage potential of the output of the rectifier of the wireless charging RX has met a specified threshold, and based thereon, negotiate, with a wireless charging transmitter (TX), to initiate a power transfer.

Example 17. The wireless charging RX of example 16, the instructions further causing the wireless charging RX to, while in the boost mode, complete, with the wireless charging TX, negotiations to initiate the power transfer at a fixed predefined operating point of the wireless charging TX; and participate, with the wireless charging TX, in the power transfer.

Example 18. The wireless charging RX of one of examples 16 or 17, the instructions further causing the wireless charging RX to identify the wireless charging RX; and configure at least one of the wireless charging RX or the wireless charging TX.

Example 19. The wireless charging RX of one of examples 16 to 18, where the specified threshold includes a minimum operating voltage threshold (UVLO).

Example 20. The wireless charging RX of one of examples 16 to 19, where the rectifier includes: a first input of the rectifier being coupled to the output of the rectifier through a first high side transistor and to electrical ground through a first low side transistor coupled; and a second input of the rectifier being coupled to the output of the rectifier through a second high side transistor and to the electrical ground through a second low side transistor, where in the boost mode, a state of the first high side transistor and a state of the first low side transistor are set in accordance with a voltage potential of the first input of the rectifier, and where a state of the second high side transistor is OFF and a state of the second low side transistor is ON.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method implemented by a wireless charging receiver (RX), the method comprising:
   detecting, by the wireless charging RX, that a voltage potential of an output of a rectifier of the wireless charging RX has met a boost mode threshold;
   placing, by the wireless charging RX, the rectifier into a boost mode; and
   detecting, by the wireless charging RX, that the voltage potential of the output of the rectifier, while operating in boost mode, has met a specified threshold, and based thereon, negotiating, by the wireless charging RX with a wireless charging transmitter (TX), to initiate a power transfer.

2. The method of claim 1, wherein detecting that the voltage potential of the output has met the boost mode threshold occurs with the rectifier being in a diode mode.

3. The method of claim 1, further comprising:
   while in the boost mode: completing, by the wireless charging RX with the wireless charging TX, the negotiating to initiate the power transfer at a fixed predefined operating point of the wireless charging TX; and participating, by the wireless charging RX with the wireless charging TX, in the power transfer.

4. The method of claim 3, wherein negotiating to initiate the power transfer comprises:
   identifying, by the wireless charging RX, the wireless charging RX; and
   configuring, by the wireless charging RX, at least one of the wireless charging RX or the wireless charging TX.

5. The method of claim 1, wherein negotiating to initiate the power transfer comprises:
   waking, by the wireless charging RX, the wireless charging RX; and
   transmitting, by the wireless charging RX to the wireless charging TX, a packet.

6. The method of claim 1, wherein the specified threshold comprises a minimal operating voltage threshold (UVLO).

7. The method of claim 6, wherein the minimal operating voltage threshold is greater than the boost mode threshold.

8. The method of claim 1, wherein participating in the power transfer comprises:
   determining, by the wireless charging RX, that the voltage potential of the output of the rectifier has met a full sync threshold, and based thereon, placing, by the wireless charging RX, the rectifier into an active full wave synchronous rectifier mode.

9. The method of claim 8, further comprising transmitting, by the wireless charging RX to the wireless charging TX, a packet during at least one of a ping phase, or an identification & configuration phase.

10. A wireless charging receiver (RX) comprising:
    a non-transitory memory storage comprising instructions; and
    one or more processors in communication with the memory storage, wherein the one or more processors execute the instructions to cause the wireless charging RX to:
    detect that a voltage potential of an output of a rectifier of the wireless charging RX has exceeded a boost mode threshold;
    place the rectifier into a boost mode; and
    detect that the voltage potential of the output of the rectifier, while operating in boost mode, has met a specified threshold, and based thereon, negotiate, with a wireless charging transmitter (TX), to initiate a power transfer.

11. The wireless charging RX of claim 10, wherein the rectifier is in a diode mode before the voltage potential of the output exceeds the boost mode threshold.

12. The wireless charging RX of claim 10, the instructions further causing the wireless charging RX to, while in the boost mode, complete, with the wireless charging TX, negotiations to initiate the power transfer at a fixed predefined operating point of the wireless charging TX; and participate, with the wireless charging TX, in the power transfer.

13. The wireless charging RX of claim 12, the instructions further causing the wireless charging RX to identify the wireless charging RX; and configure at least one of the wireless charging RX or the wireless charging TX.

14. The wireless charging RX of claim 10, wherein the specified threshold comprises a minimum operating voltage threshold (UVLO).

15. The wireless charging RX of claim 10, the instructions further causing the wireless charging RX to determine that the voltage potential of the output of the rectifier has met a full sync threshold, and based thereon, place the rectifier into an active full wave synchronous rectifier mode.

16. A wireless charging receiver (RX) comprising:
    a rectifier operatively coupled to a receive resonant circuit, the rectifier configured to output a direct current (DC) voltage in accordance with received energy received by the receive resonant circuit from a wireless charging transmitter (TX);

a non-transitory memory storage comprising instructions; and one or more controllers in communication with the memory storage, wherein the one or more controllers execute the instructions to cause the wireless charging RX to:

detect that a voltage potential of an output of the rectifier has exceeded a boost mode threshold;

place the rectifier into a boost mode; and detect that the voltage potential of the output of the rectifier, while operating in boost mode, has met a specified threshold, and based thereon, negotiate, with a wireless charging transmitter (TX), to initiate a power transfer.

17. The wireless charging RX of claim 16, the instructions further causing the wireless charging RX to, while in the boost mode, complete, with the wireless charging TX, negotiations to initiate the power transfer at a fixed pre-defined operating point of the wireless charging TX; and participate, with the wireless charging TX, in the power transfer.

18. The wireless charging RX of claim 17, the instructions further causing the wireless charging RX to identify the wireless charging RX; and configure at least one of the wireless charging RX or the wireless charging TX.

19. The wireless charging RX of claim 16, wherein the specified threshold comprises a minimum operating voltage threshold (UVLO).

20. The wireless charging RX of claim 16, wherein the rectifier comprises:

a first input of the rectifier being coupled to the output of the rectifier through a first high side transistor and to electrical ground through a first low side transistor coupled; and a second input of the rectifier being coupled to the output of the rectifier through a second high side transistor and to the electrical ground through a second low side transistor, wherein in the boost mode, a state of the first high side transistor and a state of the first low side transistor are set in accordance with a voltage potential of the first input of the rectifier, and wherein a state of the second high side transistor is OFF and a state of the second low side transistor is ON.

\* \* \* \* \*